No. 644,159. Patented Feb. 27, 1900.
E. A. BLANTON, Jr.
NUT LOCK.
(Application filed Sept. 24, 1898.)
(No Model.) 2 Sheets—Sheet 1.

Witnesses
Inventor
Edward A. Blanton Jr.
By
Attorneys

No. 644,159. Patented Feb. 27, 1900.
E. A. BLANTON, Jr.
NUT LOCK.
(Application filed Sept. 24, 1898.)
(No Model.) 2 Sheets—Sheet 2.
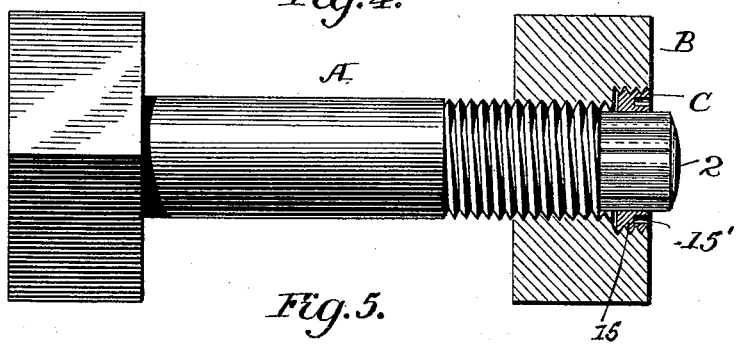
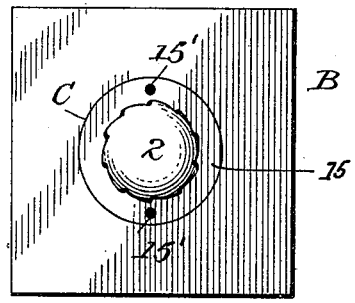
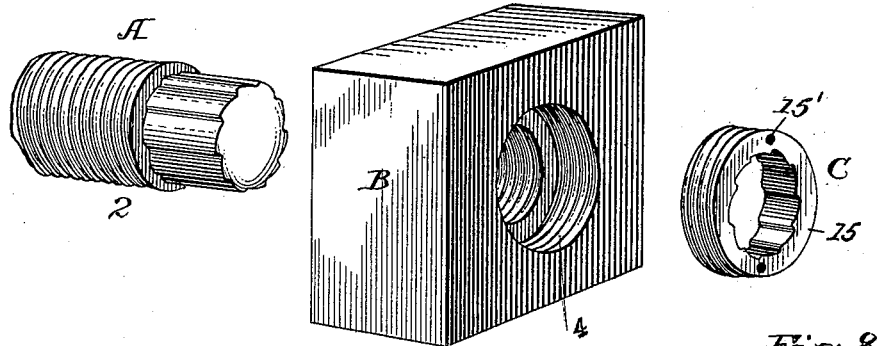
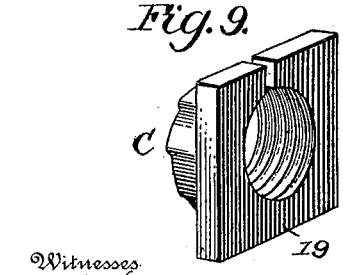
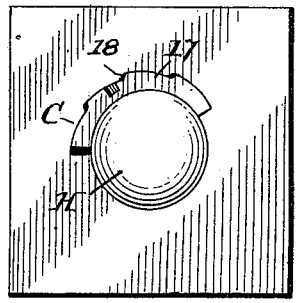
Witnesses
J. G. Hinkel
Harry E. Hay
Inventor
Edward A. Blanton Jr.
By Foster Freeman
Attorneys

UNITED STATES PATENT OFFICE.

EDWARD A. BLANTON, JR., OF RIDLEY PARK, PENNSYLVANIA.

NUT-LOCK.

SPECIFICATION forming part of Letters Patent No. 644,159, dated February 27, 1900.

Application filed September 24, 1898. Serial No. 691,791. (No model.)

*To all whom it may concern:*

Be it known that I, EDWARD A. BLANTON, Jr., a citizen of the United States, residing at Ridley Park, in the county of Delaware and State of Pennsylvania, have invented certain new and useful Improvements in Nut-Locks, of which the following is a specification.

This invention relates to certain new and useful improvements in nut or bolt locks, having for its object to provide a simple and exceedingly efficient lock which may be cheaply manufactured, quickly applied, and one which will securely hold a bolt and nut against relative movement.

With this object in view the invention consists in the novel construction and combination of the parts hereinafter set forth with more particularity.

Figure 1:
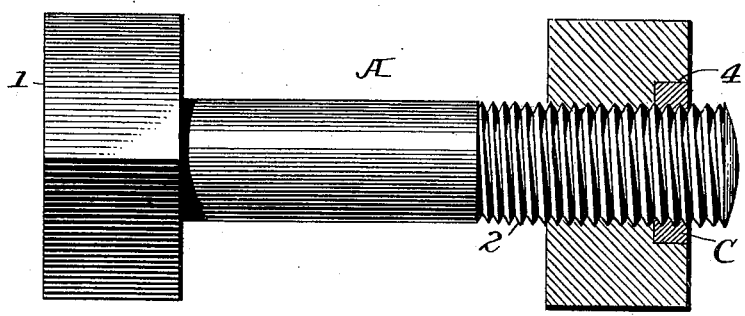
Figure 2:
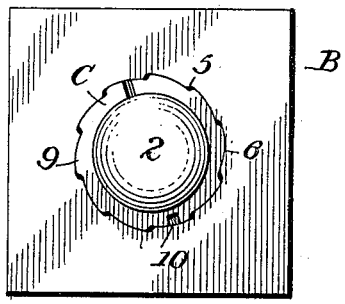
Figure 3:
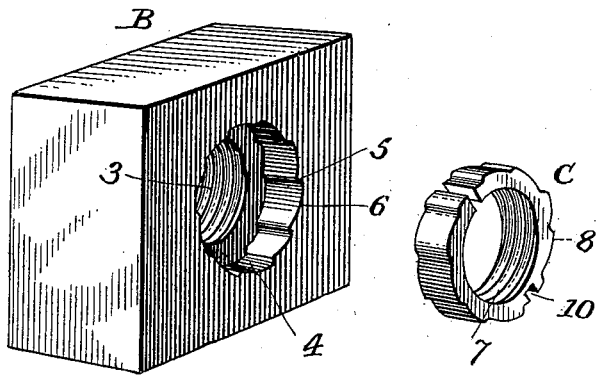

In the accompanying drawings, forming a part of this specification, and in which like letters and numerals of reference designate corresponding parts, Figure 1 is a sectional view of a bolt and nut with one construction of lock embodying the invention applied thereto. Fig. 2 is an end view thereof. Fig. 3 is a perspective view of the nut and locking device detached. Fig. 4 is a sectional view of one end of a bolt with a nut and a modified construction of locking device embodying the invention applied thereto. Fig. 5 is an end view thereof. Fig. 6 is a perspective view of the parts detached. Fig. 7 is an end view of another modification of the invention. Fig. 8 is a detail perspective view of the locking-piece, and Fig. 9 is a similar view of another modified form of locking-piece.

Referring more particularly to the drawings, A designates a bolt, which may be of any suitable or ordinary construction. As shown, however, it is provided with a head 1, with angular sides, and a shank 2, threaded at its outer end and formed smooth intermediate the threaded portion and head, and the said shank is preferably round in cross-section and of uniform diameter throughout its length.

Upon the threaded end of the bolt-shank 2 is adapted to be received a nut B, which may be of any desired size and contour and is provided with the usual central threaded opening 3. In its outer face the nut is formed with a recess 4, through which the end of the bolt is adapted to extend, the said recess being of greater diameter than the threaded opening through the nut and adapted to receive a locking-piece C. The recess 4 may be either segmental and partially surround the threaded nut-opening 3, as shown in Fig. 7, or it may be continuous and entirely surround the said opening, and the curved wall of the recess, as shown in Figs. 2, 3, and 7, is formed with one or more depressions 5, having inclined curved surfaces constituting internal bosses 6. Preferably, however, the wall is formed with a series of these depressions and inclined surfaces, as shown, the number of the depressions and inclinations of their surfaces varying under different conditions, and preferably, also, the depressions are equidistantly spaced or segmentally arranged.

The locking-piece C may be either in the form of a collar, a split sleeve, or a segment, as shown in the various figures of the drawings, and said locking-piece is formed in its interior curved surface with screw-threads 7 and on its exterior curved surface with one or more bosses 8, the faces of which latter are preferably curved on gradually-increasing radii measuring from the center of the bolt when the parts are adjusted in position. Thus, as shown in Figs. 2 and 3, the locking-piece C is in the form of split sleeve 9, having slightly-separated ends and internal screw-threads, and said sleeve is adapted to be screwed upon the end of the bolt-shank 2 and to be received into the recess 4. Upon its exterior surface the sleeve 9 is provided with a series of said bosses 8, which extend circumferentially around the same and are equidistantly spaced, the curved surfaces of said bosses being somewhat less in length than the corresponding surfaces of the recess 4, with which they are adapted to engage, in order that a slight space may be left between the thickened portions of the bosses and the correspondingly-curved but oppositely-arranged surfaces 6 of the depressions 5. The sleeve 9 may be of any desired thickness; but it is preferably so constructed that its separated ends may be drawn together to tighten the sleeve around the bolt and increase the frictional contact between its internal threads and those of the said bolt, this being effected by the curved surfaces of the eccentric bosses of the sleeve riding upon the corresponding curved but oppositely-arranged surfaces 6 of the depressions 5 of the nut. In order to facilitate this contraction of the sleeve, or rather the locking-piece, it may be weakened at one or more points around its circumference—as, for instance, by forming longitudinal grooves 10 in its outer surface, one of such grooves being shown in Figs. 2 and 3, arranged diametrically opposite the separated ends of the sleeve.

While it is believed that the operation of the parts shown in Figs. 1 to 3 will be apparent, it may be briefly summarized as follows: The split sleeve or locking-piece is inserted into the recess of the nut B, bringing the eccentric faces of its bosses into engagement with the correspondingly-curved but oppositely-arranged surfaces formed in the wall of the recess. The nut and locking piece are then screwed upon the threaded end of the bolt until the former is brought tightly against the face of one of the parts to be secured. If now any accidental tendency of the nut turning in a direction to unscrew it from the bolt occurs, the locking-piece will also turn by reason of the frictional contact between its threads and those of the nut, causing the surfaces of the bosses of the locking-piece to ride upon those of the nut, resulting in the contraction of the locking-piece around the bolt and the consequent increase of frictional contact between the said locking-piece and bolt, thereby preventing relative movement between the two.

In the modified form of the invention illustrated in Figs. 4 to 6 the locking-piece C is in the form of a continuous collar 15, provided with external screw-threads, which are reversely arranged to those of the bolt A—that is to say, the threads of the bolt are right screw-threads and those of the locking-piece left screw-threads—and the interior surface of the said locking-piece is formed with a series of equidistantly-spaced bosses having curved, eccentric, or convolute surfaces corresponding to the surfaces 6 of Figs. 2 and 3. The nut B, as in the figures referred to, is provided with a recess 4, which recess is formed with left female screw-threads, into which mesh the external threads of the locking-piece C. When it is desired to adjust the above-described parts into operative position, the nut B is screwed upon the bolt until the bossed end of the latter projects through the threaded recess 4. The locking-piece C is then slipped longitudinally upon the end of the bolt, bringing the eccentric surfaces of its internal bosses into contact with those of the bolt. Then by the continued turning of the bolt in the direction to tighten its nut the locking-piece, by reason of the frictional engagement of the shoulders between its bosses and those of the bosses of the bolt, will be turned, causing it to screw into and enter the threaded recess of the nut. If now it is attempted to unscrew the bolt A from the nut B, the locking-piece C will be turned with the bolt by reason of the eccentric surfaces of its bosses riding upon the corresponding surfaces of the bolt, and in consequence the inclined surface of the locking-piece C will ride upon those of the bolt, thereby locking these two parts together and against relative movement. When it is desired, however, to remove the nut and locking-piece from the bolt, this may be accomplished by inserting a spanner or other suitable tool into the holes 15' in the outer edge of the locking-piece C and turning the same to bring the shoulders between its bosses and those between the bosses of the bolt into contact, thereby carrying the frictional eccentric surfaces of the two sets of bosses out of contact. The bolt or nut may then be readily turned and the parts separated. While the locking-piece shown in the above-described construction is in the form of a continuous collar, it will be obvious that it may be in the form of a split sleeve, as illustrated in Figs. 2 and 3.

The modified construction of the invention illustrated in Figs. 7 and 8 is in all respects identical with the construction shown in Figs. 1 to 3, except that the locking-piece is in the form of a segment 17, fitting into a correspondingly-shaped recess 18 in the face of the nut, the said locking-piece being formed with interior screw-threads and exterior bosses and the recess 18 being provided with internal bosses, the surfaces of which are adapted to engage with the corresponding but reversely-arranged bosses of the segment.

The modified form of locking-piece illustrated in Fig. 9 is formed at one end with a polysided head 19, adapted when in use to project from the face of the nut to be engaged by a wrench, by means of which the locking-piece may be held against rotation.

Without limiting myself to the precise construction and arrangement of the parts shown and described, since it will be obvious that various changes in such construction and arrangement may be made without departing from the spirit or scope of the invention—

What I claim is—

1. In a nut-lock, the combination with a bolt and a nut formed with a recess, the said bolt and nut being provided one with screw-threads and the other with a series of eccentric bosses having curved surfaces of gradually-increasing radii, and a locking-piece adapted to be inserted into the recess of said nut and formed with screw-threads and with a series of bosses for engaging the threads and bosses of the bolt and nut, the engaging bosses being constructed to permit a limited movement of the parts relative to each other when moved in one direction, substantially as described.

2. In a nut-lock, the combination with a bolt and a nut formed with a recess, the said bolt and nut being provided one with screw-threads and the other with a series of eccentric bosses having curved surfaces of gradually-increasing radii, and a contractible locking-piece having separated ends and adapted to be inserted into the recess of the nut and formed with screw-threads and with a series of bosses for engaging the threads and bosses of the bolt and nut, substantially as described.

In testimony whereof I have signed my name to this specification in the presence of two subscribing witnesses.

EDWARD A. BLANTON, JR.

Witnesses:
A. L. BOEKENKAMP,
E. S. H. BLANTON.